United States Patent [19]

Hinden

[11] Patent Number: 4,980,401

[45] Date of Patent: Dec. 25, 1990

[54] CHEMICAL RESISTANT TILE AND BRICK MORTAR

[76] Inventor: Edwin R. Hinden, 11633 Frontier Dr., St. Louis, Mo. 63146

[21] Appl. No.: 264,537

[22] Filed: Oct. 31, 1988

[51] Int. Cl.$^5$ ............................ C08K 9/04; C08K 5/19; C08K 3/34
[52] U.S. Cl. .................................... 523/461; 523/216; 523/466; 524/188; 524/714
[58] Field of Search ................ 523/216, 461; 524/714, 524/188

[56] References Cited

U.S. PATENT DOCUMENTS

| | | | |
|---|---|---|---|
| 2,768,992 | 10/1956 | Zukas | 523/216 |
| 3,021,234 | 2/1962 | Casement et al. | 523/216 |
| 3,974,125 | 8/1976 | Oswald et al. | 523/216 |
| 4,558,075 | 12/1985 | Suss et al. | 523/216 |

*Primary Examiner*—Lewis T. Jacobs
*Attorney, Agent, or Firm*—Polster, Polster and Lucchesi

[57] ABSTRACT

A thermosetting composition for chemical resistant tile and brick mortar is disclosed. The composition includes a thermosetting resin having a content of 10–25% by weight (and having trace amounts of a promoter such as an amine or amide and optionally having trace amounts of a stabilizer such as cobalt naphthenate) for use with a pre-mixed dry powder comprising the remainder. The pre-mixed dry powder includes an aggregate such as silica having a content of 75–90% by weight, a pigment such as titanium dioxide or iron oxide having a content of 0.25–2% by weight, a catalyst such as benzoyl peroxide having a content of 0.1–4% by weight, and a thickener consisting of organoclay having a content of $\frac{1}{2}$–6% by weight.

9 Claims, No Drawings

CHEMICAL RESISTANT TILE AND BRICK MORTAR

BACKGROUND OF THE INVENTION

The present invention relates to a thermosetting composition for chemical resistant tile and brick mortar, and more particularly to an asbestos-free mortar which includes a themosetting resin and a pre-mixed dry powder compound which are easily mixable on site.

Mortars are used for a variety of different purposes including plastering, rendering and masonry bonding, and providing weatherproof joints and surfaces. Most of the mortars are made by furnishing pigment and aggregate to the contractor who then mixes these elements with a liquid, usually water, to suit the contractor's needs in providing the desired mortar.

Unlike general use mortars, chemical resistant tile and brick mortars are more specific and exacting, and furthermore, are furnished completely formulated. Chemical resistant tile and brick mortar is used, for example, between tiles for lining paper mills.

In a typical known compound, a pre-mixed dry powder includes an aggregate, a pigment, a thickener and catalyst which are mixed together. The pre-mixed dry powder is then combined with a resin (with trace amounts of a promoter and stabilizer) at the point of application, to provide the previously known commercial chemical mortar for chemical resistant tile and brick mortar.

The pre-mix dry powder components, which are combined and furnished separately from the liquid components, are very stable with very little separation or stratification of components occuring from the beginning of processing to the point of application. This stability, in large measure, is due to the use of asbestos for the thickener in the pre-mixed dry powder. During application, asbestos thickened mortars are very workable and easy to trowel. They also have good "green" strength, that is, as a soft uncured or "green" mortar, the mortar can support two or three courses of tile without the mortar squeezing out of the mortar joint or shifting of the tile. When the asbestos thickened mortar has cured, it has outstanding adhesion and strength properties.

On the other hand, it is well known that asbestos, and more particularly asbestos fiber, is a hazardous substance. As a result, efforts have been made to produce an asbestos-free mortar for chemical resistant tile and brick; however, unfortunately, asbestos-free mortar, up to the development of the present invention, lacks many of the required properties described above for commercial chemical mortar used in chemical resistant masonry work.

SUMMARY OF THE INVENTION

Among the several objects and advantages of the present invention are the provision of a new and improved thermosetting compound for chemical resistant tile and brick mortar.

A second object is the provision of the aforementioned chemical resistant tile and brick mortar which is totally asbestos-free, while retaining all of the advantages of the prior art asbestos thickened chemical resistant tile and brick mortars A third object is the provision of the aforementioned chemical resistant tile and brick mortar which uses organoclay, in lieu of asbestos as a thickener, in a new and unexpected manner, while achieving all of the heretofore described advantages where asbestos was used as a thickener.

A fourth object is the provision of the aforementioned chemical resistant tile and brick mortar which, by incorporating organoclay in the pre-mixed dry powder, has high strength and good troweling properties for the "green" uncured mortar, and high tensile and compressive strength properties for the cured mortar.

A fifth object is the provision of the aforementioned chemical resistant tile and brick mortar which, by incorporating organoclay, gives good non-segregating storage properties including the ability to keep the powder ingredients from separating and stratifying during processing, handling and storage.

A sixth object is the provision of a new and improved method of preparing a pre-mixed chemical resistant tile and brick mortar which allows the furnishing of a completely formulated pre-mixed asbestos-free dry powder for mixture, on site and without special equipment, with a thermosetting resin.

Briefly stated, the thermosetting composition for chemical resistant tile and brick mortar and the like comprises a thermosetting resin having a content of 10–25% by weight (having trace amounts of a promoter and a stabilizer) for use with a pre-mixed dry powder. The pre-mixed dry powder includes the following: an aggregate having a content of 75–90% by weight, a pigment having a content of 0.25–2% by weight, a catalyst having a content of 0.1–4% by weight, and a thickener consisting of organoclay having a content of $\frac{1}{2}$–6% by weight.

The organoclay is a smectite clay selected from the group consisting of montmorillorite, bentonite, hectorite, saponite or the like, at least part of the exchangeable cations of which are replaced by quaternary ammonium cations containing at least one alkyl group having from ten (10) to twenty-four (24) carbon atoms.

The thermosetting resin, having a content of 10–25% by weight, is a vinyl ester resin with a promoter and optionally including a stabilizer. The promoter, and stabilizer if present, each occur in trace amounts. The promoter is an amide or an amine and the stabilizer is cobalt naphthenate.

The aggregate, having a content of 75–90% by weight, is silica which ranges in screen size from about 98% through a 325 mesh screen to about 60% retained on a 40 mesh screen.

The pigment, having a content of 0.25–2% by weight, may by way of example be titanium dioxide for a white color or iron oxide for a red color.

The catalyst, having a content of 0.1–4% by weight, is benzoyl peroxide.

In preparing the pre-mixed chemical resistant tile and brick mortar and the like, the dry powder compound is pre-mixed and includes the aggregate, pigment, catalyst, and the thickener consisting of organoclay. At the point of application, a vinyl ester thermosetting resin containing trace amounts of a promoter and optionally containing trace amounts of a stabilizer is added to the aforementioned pre-mixed dry powder compound. The vinyl ester thermosetting resin is readily mixed with the dry powder compound (the mixing can even be done by hand) to provide the chemical resistant tile and brick mortar desired.

These and other objects and advantages of the present invention will become more apparent from the ensuing description.

DESCRIPTION OF THE PREFERRED EMBODIMENT

In the description that is to follow, the term "organoclay" is used to define an organophilic cation-modified clay derived from a clay mineral, generally of the smectite group, for example bentonite, montmorillorite, hectorite, saponite or the like, by replacing the inorganic exchangeable cations, generally alkyl or alkaline earth metal cations, which occur in the natural clay mineral, by organic cations each comprising at least one hydrocarbon radical which has sufficient carbon atoms to render the surface of the cation-exchanged clay hydrophobic. More specifically, organoclays are generally smectite clays, montmorillorite, bentonite, hectorite, saponite or the like, at least part of the exchangeable cations of which are replaced by quaternary ammonium cations containing at least one alkyl group having from ten (10) to twenty-four (24) carbon atoms.

Organoclays have been found to be very useful as thixotropic agents in various applications such as, for example, lubricating greases, oil-based drilling fluids, paints, varnishes, enamels and printing inks. However, an organoclay is, in general, difficult to disperse in these substances to form the uniform gel structure which is required to thicken or increase the viscosity of the substance.

Organoclay is used in the manufacture of liquid paint because of its non-settling and viscosity control properties. However, the organoclay needs proper dispersing within the liquid paint medium in order to perform properly. Paint makers typically use dispersers, for the most part, to incorporate organoclay in a totally pre-manufactured liquid paint which is ready for application with little additional attention, except for stirring or a little thinning. In some instances, the organoclay is dispersed in a separate pre-gel operation, just to get the proper performance of the organoclay. In such cases, the liquid pre-gel is added to the paint process at some convenient point, while the organoclay is being dispersed. Often, only higher energy milling gives proper performance of the organoclay in liquid paint.

The present invention describes a totally new and unexpected result which involves the use of organoclay as part of a pre-mixed dry powder compound which is subsequently intermixed with a liquid component, to provide a chemical resistant tile and brick mortar. As will be described in detail hereafter, the manner in which organoclay is used in the pre-mixed dry powder compound and the results produced by its subsequent intermixture with a thermosetting resin are totally new and unexpected.

PRIOR ART EXAMPLES

A well known general composition for chemical resistant tile and brick mortars includes the following:

| | | |
|---|---|---|
| Resin | 10–25% | weight |
| Aggregate | 75–90% | weight |
| Pigment | 1–10% | weight, if present |
| Thickener | .5–10% | weight, if present |
| Catalyst | .25–.5% | weight, if present |
| Promoter | | trace, if present |
| Stabilizer | | trace, if present |

There are older prior art general use chemical mortars which are designed for filling pot holes, levelling various concrete constructed structures, and bonding various masonry structures. With those mortars, the resin component is furnished separately from the other components and may comprise a vinyl ester containing a promoter and, optionally, a stabilizer, or it may comprise an epoxy-amine resin. The other components of these older prior art mortars are not pre-mixed but rather are intermixed individually with the resin composition, at the time of application since the amount added is not critically important. The aggregate for these prior art mortars can range in grade from silica flower i.e., silica passing through a 325 mesh screen, to Pea gravel having a thickness of ⅛ inch or more, or any mixture of these and other grades in between. The pigment, if any, may be titanium dioxide if a white color is desired or iron oxide if a red color is desired, and various grades of pigment can be used. A dry catalyst (benzoyl peroxide), or more preferably a liquid catalyst (methyl ethyl ketone peroxide), in a narrow range is added on the job; the amount depending on the resin, temperature conditions and size of the mix and the like. With epoxy-based mortars, peroxide catalysts, of course, are not used at all. In some cases, a thickener is not used at all, but where a thickener is used, it is usually asbestos or collodial silica.

With other, asbestos-thickened chemical resistant tile and brick prior art mortars, the resin component is furnished separately from the other components (similar to the present invention) and the other components are premixed together for mixing with the resin on the job. These compositions are very similar to the composition of the present invention but they include an asbestos thickener. Such asbestos-thickened mortars offer many and numerous advantages including stability, little separation or stratification of components, easy workability of the soft uncured "green" mortar, good "green" strength enabling support of two or three courses of tile without mortar squeezing out of the mortar joint or shifting the tile, and outstanding adhesion and strength properties for the cured mortar.

Unfortunately, asbestos thickened mortar, while having all of the above described features and advantages, is nonetheless a hazardous substance, because of the asbestos fibers from which the asbestos is made. Although attempts have been made to eliminate asbestos entirely from mortar or develop mortar with an asbestos substitute, up until the development of the present invention there was no asbestos-free mortar which exhibited the outstanding properties inherent in asbestos thickened chemical resistant tile and brick mortar, as described above.

There has thus been a long felt need for a chemical resistant tile and brick mortar which retains all of the outstanding properties of asbestos-thickened mortar, without use of asbestos or any other hazardous substance.

EXAMPLE OF THE INVENTION

I have discovered a new and unexpected use and result by incorporating organoclay in a pre-mixed dry powder compound, such that when intermixed with a thermosetting resin, the aforementioned desired properties for an outstanding commercial chemical resistant tile and brick mortar have been produced. Although organoclay is widely known for its use in liquid paint products and the like for its non-settling and viscosity control properties, organoclay is not known for use in pre-mixed dry powders or products, or for use in a chemical resistant tile and brick mortar, as described herein.

According to my invention, the preferred thermosetting composition for chemical resistant tile and brick mortars includes the following ingredients, by percentage weight content, described as follows:

| Resin | 10–25% weight |
|---|---|
| Aggregate | 75–90% weight |
| Pigment | ½–2% |
| Catalyst | 1/10–4% |
| Thickener-Organoclay | ½–6% |
| Promoter | trace, if present |
| Stabilizer | trace, if present |

The liquid component of the chemical mortar is a thermosetting resin such as vinyl ester resin with trace amounts of a promoter and optionally having trace amounts of a stabilizer. The promoter is an amine or amide and the stabilizer is cobalt naphthenate. The pre-mixed dry powder compound includes the remaining components having the percentage by weight content as set forth above, and as further described below. The aggregate is silica ranging in screen size from about 98% through a 325 mesh screen to about 60% retained on a 40 mesh screen. The pigment is again preferably titanium dioxide for a white color or iron oxide for a red color. The catalyst is benzoyl peroxide In lieu of asbestos, organoclay is used in the pre-mixed dry powder compound to obtain the desired properties for the outstanding commercial grade chemical resistant tile and brick mortar of the present invention.

Organoclay is not known for being added to liquid product as a pre-mixed dry powder, while only using hand mixing techniques for proper incorporation. In fact, organoclay used in the liquid paint industry must be properly dispersed through high speed automatic mixing equipment, in order for organoclay to be used in the liquid paint at all. In the practice of my invention, the organoclay is part of the pre-mixed dry powder component which can be intermixed with the thermosetting resin liquid component by simple hand mixing. Unlike paint, the final preparation of my chemical mortar is complete once the thermosetting resin liquid component is intermixed with the pre-mixed dry powder component, requiring no further dispersion or other steps at time of application. The organoclay does not need pre-gelling or dispersing to get it properly deployed, since simple addition or intermixing between the liquid and pre-mixed dry powder components, as with hand mixing, is the only requirement.

In my above described example, I used an organoclay having a tradename "Claytone 40" produced by Southern Clay Products of Gonzalee, TX. Of course, in the practice of my invention, other organoclays (including by way of example the following) may be used, depending on the particular pre-mixed dry powder compound desired. For example, and not by way of limitation the following organoclays may be used: Those organoclays sold by Southern Clay Products under the trade designations Claytone 34, Claytone HT, Claytone PS, Claytone AF, and Claytone APA, or those sold by NL Industries under the trade designations Bentone 34 and Bentone 38. Competitive organoclays are also usable as well.

The use and deployment of organoclay in the pre-mixed dry powder compound provides a new and improved product, without the need to use asbestos. Among the many advantages which have resulted from the use of organoclay in the pre-mixed dry powder compound include keeping the powder ingredients from separating and stratifying during processing, handling and storage. The pre-mixed dry powder compound, incorporating organoclay and intermixed with the thermosetting resin composition for application as a chemical resistant tile and brick mortar, imparts strength to the "green" uncured mortar, enabling good troweling properties, and allowing the "green" soften uncured mortar to support two, three or more courses of tile. The finally cured mortar also produces high tensile and compressive strength properties, as well. Additionally, high strength stickiness for good initial and final adhesion of the mortar joints is also provided.

In all products described above where organoclay has previously been used, it was never intended, nor did it ever provide any high strength properties. Organoclay was known to give fragile gel structure that allows a great deal of motion in finished paint products, while allowing paint to flow and level, as well as to brush and spray. Organoclay is not expected, and has never been used to give live load support properties. In my invention, on the other hand, organoclay incorporated in the pre-mixed dry powder compound and intermixed with the thermosetting resin compound, produces the above described and other properties in a new and improved way to provide chemical resistant tile and brick mortar that has advantages at least equal to all of the previously known advantages of asbestos-thickened mortar, while eliminating asbestos, a known hazardous substance.

In view of the above, it will be seen that the several objects and features of this invention are achieved and other advantageous results obtained.

As various changes could be made in the above compositions and methods without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A thermosetting composition for chemical resistant tile and brick mortar and the like comprising an admixture of a thermosetting resin with a pre-mixed dry powder compound including an aggregate and a thickener consisting essentially of organoclay with the respective contents of the components being approximately 10–25% by weight of resin for the composition as a whole, said thermosetting resin being vinyl ester resin, 75–90% by weight of aggregate for the composition as a whole, and ½–6% by weight of thickener for the composition as a whole.

2. A thermosetting composition for chemical resistant tile and brick mortar and the like comprising an admixture of a thermosetting resin with a pre-mixed dry powder compound including an aggregate and a thickener consisting essentially of organoclay with the respective contents of the components being approximately 10–25% by weight of resin for the composition as a whole, 75–90% by weight of aggregate for the composition as a whole, and ½–6% by weight of thickener for the composition as a whole, and further including a catalyst having a content of approximately 0.1–4% by weight of the composition, and wherein said catalyst is benzoyl peroxide.

3. A thermosetting composition for chemical resistant tile and brick mortar and the like comprising an admixture of a thermosetting resin with a pre-mixed dry powder compound including an aggregate and a thickener consisting essentially of organoclay, and cobalt naphthene as a stabilizer, with the respective contents of the components being approximately 10-25% by weight of resin for the composition as a whole, 75-90% by weight of aggregate for the composition as a whole, and ½-6% by weight of thickener for the composition as a whole, with the stabilizer being added to the composition in trace amounts.

4. A thermosetting composition for chemical resistant tile and brick mortar and the like comprising a thermosetting vinyl ester resin having an amine or amide promoter, the resin being mixed with a premixed dry powder including a silicon aggregate, a titanium oxide or iron oxide pigment, a benzoyl peroxide catalyst, and an organoclay thickener, with the respective contents of the components being approximately 10-25% by weight of resin for the composition, approximately 75-90% by weight of aggregate for the composition, approximately 0.25-2% by weight of pigment for the composition; approximately ½-6% by weight of thickener for the composition, and the stabilizer being added in trace amounts to the composition.

5. The composition as defined in claim 4 further including a cobalt naphthenate stabilizer which is added in trace amounts to the thermosetting resin.

6. The composition as defined in claim 4 wherein said organoclay is selected from the group consisting of montmorillorite and hectorite.

7. A method of preparing a pre-mixed chemical resistant tile and brick mortar and the like, comprising the steps of:
(a) pre-mixing a dry powder compound including a silica aggregate having a content of 70-90% by weight with an organoclay thickener having a content of ½-6% by weight of the finished mortar;
(b) adding a vinyl ester thermosetting resin having a content of 10-25% by weight to the aforementioned dry powder compound; and
(c) mixing the vinyl ester thermosetting resin with the aforementioned dry powder compound to provide a chemical resistant tile and brick mortar and the like.

8. The method as defined in claim 7 wherein the mixing is performed by hand.

9. A thermosetting composition for chemical resistant tile and brick mortar comprising a mixture of a vinyl ester thermosetting resin with a pre-mixed dry powder compound including an aggregate, a thickener consisting essentially of an organoclay, a benzoyl peroxide catalyst, and a cobalt naphthenate stabilizer, the resin being 10-15% by weight for the composition as a whole, the aggregate 75-90% by weight for the composition as a whole, the thickener ½-6% by weight for the composition as a whole, the catalyst 0.1-4% by weight for the composition as a whole, and the stabilizer being added in trace amounts.

* * * * *
* * * * *